(12) United States Patent
Oki et al.

(10) Patent No.: US 8,136,674 B2
(45) Date of Patent: Mar. 20, 2012

(54) FILTER DEVICE AND METHOD FOR MANUFACTURING THE SAME

(75) Inventors: Hironobu Oki, Oyama (JP); Junko Amagai, Koga (JP)

(73) Assignee: Kyosan Denki Co., Ltd., Koga (JP)

(*) Notice: Subject to any disclaimer, the term of this patent is extended or adjusted under 35 U.S.C. 154(b) by 1133 days.

(21) Appl. No.: 11/953,904

(22) Filed: Dec. 11, 2007

(65) Prior Publication Data
US 2008/0149559 A1 Jun. 26, 2008

(30) Foreign Application Priority Data

Dec. 21, 2006 (JP) .................................. 2006-344954

(51) Int. Cl.
B01D 29/13 (2006.01)
B01D 29/50 (2006.01)
B01D 29/00 (2006.01)

(52) U.S. Cl. .................... 210/416.4; 210/453; 210/445; 210/315; 210/337; 210/342; 210/490

(58) Field of Classification Search .................. None
See application file for complete search history.

(56) References Cited

U.S. PATENT DOCUMENTS

| | | | |
|---|---|---|---|
| 3,511,382 A | 5/1970 | Mesek | |
| 3,935,111 A * | 1/1976 | Bentley | 210/446 |
| 4,087,363 A * | 5/1978 | Rosemeyer et al. | 210/315 |
| 4,414,172 A | 11/1983 | Leason | |
| 4,450,078 A | 5/1984 | Walker et al. | |
| 4,544,588 A | 10/1985 | Schauf | |
| 4,701,267 A | 10/1987 | Watanabe et al. | |
| 4,826,598 A | 5/1989 | Cain | |
| 5,556,541 A | 9/1996 | Ruschke | |
| 5,688,460 A * | 11/1997 | Ruschke | 264/263 |
| 5,723,047 A | 3/1998 | Turnbull | |
| 5,968,373 A | 10/1999 | Choi | |
| 6,367,634 B1 | 4/2002 | Lynn et al. | |
| 6,427,846 B1 * | 8/2002 | Graus et al. | 210/445 |

(Continued)

FOREIGN PATENT DOCUMENTS

DE 3344374 5/1984
(Continued)

OTHER PUBLICATIONS

Japanese Office Action dated Nov. 24, 2010 issued in corresponding Japanese Application No. 2006-344954 with English Translation.

(Continued)

Primary Examiner — Nam X Nguyen
Assistant Examiner — Madeline Gonzalez
(74) Attorney, Agent, or Firm — Nixon & Vanderhye PC

(57) ABSTRACT

A filter device includes a filtering member having a rough part, which is comparatively low in a density of flow pores for flowing fluid, and a dense part, which is comparatively high in the density of the flow pores. The filter device further includes a support member that supports the filtering member and has an inflow passage and a discharge passage. The dense part supports the rough part, and is located between the rough part and the discharge passage, and is supported by a mechanical pressure applied by the support members. The filter device is capable of supporting the filtering member easily in a case member and securing a filtering area to enhance the performance of removing a foreign matter.

16 Claims, 14 Drawing Sheets

U.S. PATENT DOCUMENTS

| | | | |
|---|---|---|---|
| 6,432,307 B2 * | 8/2002 | Gizowski et al. | 210/321.6 |
| 6,874,643 B2 * | 4/2005 | Iwamoto | 210/461 |
| 7,140,496 B2 * | 11/2006 | Nagoya et al. | 210/490 |
| 2002/0139744 A1 | 10/2002 | Choi | |
| 2005/0139543 A1 | 6/2005 | Choi | |
| 2007/0227359 A1 | 10/2007 | Choi | |

FOREIGN PATENT DOCUMENTS

| | | |
|---|---|---|
| DE | 3514189 | 10/1986 |
| DE | 9012319 | 1/1991 |
| EP | 0024601 | 3/1981 |
| EP | 0265163 | 4/1988 |
| JP | 60-209218 | 10/1985 |
| JP | 08-210211 | 8/1996 |
| JP | 2004-243314 | 9/2004 |
| WO | WO99/03525 | 1/1999 |

OTHER PUBLICATIONS

EP Search Report issued Apr. 28, 2008 in counterpart EP Application No. 07119642.2.

* cited by examiner

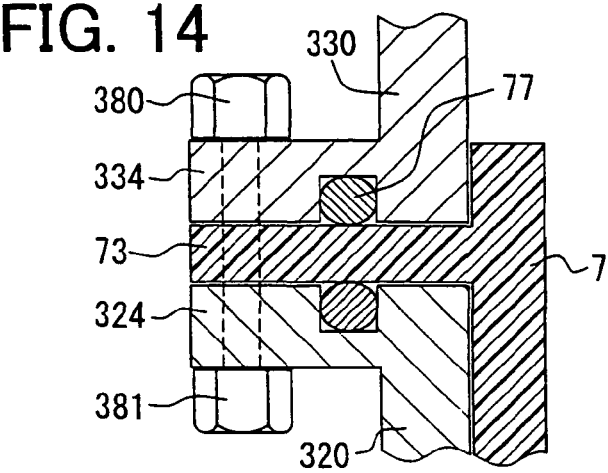
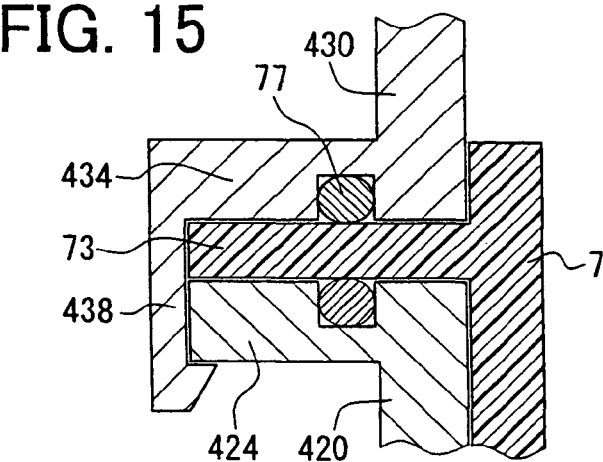
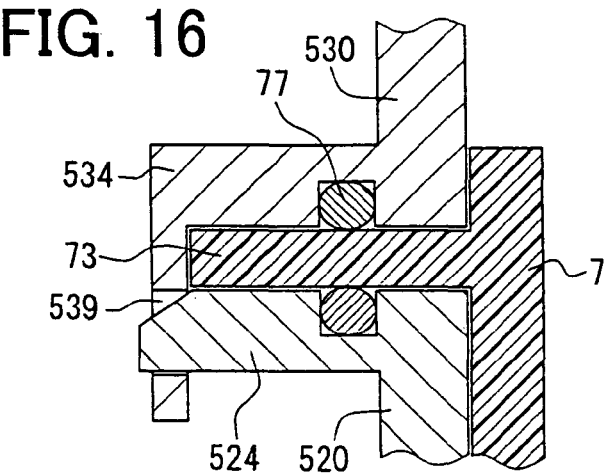

US 8,136,674 B2

FILTER DEVICE AND METHOD FOR MANUFACTURING THE SAME

CROSS REFERENCE TO RELATED APPLICATIONS

This application is based on and incorporates herein by reference Japanese Patent Application No. 2006-344954 filed on Dec. 21, 2006.

FIELD OF THE INVENTION

The present invention relates to a filter device. The present invention further relates to a method for manufacturing the filter device.

BACKGROUND OF THE INVENTION

A filter device 800 for capturing foreign matters in fluid has been known (see JP-A-8-210211). This filter device 800, as shown in FIG. 19, is constructed of a filtering member 801, a case 802 for housing the filtering member 801, and a cap 803. The filtering member 801 is made by overlaying a wavy filtering sheet on a plate-shaped filtering sheet and then by rolling the sheets. Thus, the filtering member 801 is vulnerable to a force in a radial direction. Therefore, when the filtering member 801 is housed in the case 802, an adhesive 804 is put between the outer peripheral wall of the filtering member 801 and the inner wall of the case 802. The adhesive 804 makes the case 802 support the filtering member 801 and seals a gap between the case 802 and the filtering member 801 to restrict fluid flowing into the case 802 from being discharged without passing through the filtering member 801.

However, in the above-mentioned filter device 800, the adhesive 804 is put between the filtering member 801 and the case 802 so as to fix the filtering member 801 to the case 802. In this condition, there is presented a problem that the adhesive 804 is impregnated into part of the filtering member 801 or is oozed out into a portion, in which fluid is supposed to flow under normal circumstances, by extra supply of the adhesive 804 to reduce a filtering area. As a result, the filtering member 801 itself cannot be sufficiently utilized.

SUMMARY OF THE INVENTION

In view of the foregoing and other problems, it is an object of the present invention to produce a filter capable of easily supporting a filtering member in a case and securing a filtering area to enhance the performance of removing a foreign matter. It is another object of the present invention to produce a method for manufacturing the filter device.

According to one aspect of the present invention, a filter device comprises a filtering member having a rough part, which is low in a density of flow pores for flowing fluid, and a dense part, which is high in the density of the flow pores. The filter device further comprises a support member that supports the filtering member, and has an inflow passage and a discharge passage. The dense part supports the rough part. The dense part is located between the rough part and the discharge passage, and supported by being applied with a mechanical pressure from the support member.

According to another aspect of the present invention, a method for manufacturing a filter device, the method comprises connecting a rough part, which is low in a density of flow pores for flowing fluid, with a dense part, which is high in the density of the flow pores, such that the dense part supports the rough part. The method further comprises axially combining a first support member with a second support member to apply a mechanical pressure radially to the dense part such that the first support member supports the dense part.

BRIEF DESCRIPTION OF THE DRAWINGS

The above and other objects, features and advantages of the present invention will become more apparent from the following detailed description made with reference to the accompanying drawings. In the drawings:

FIG. 14 is a cross-sectional view of a main portion of a fuel filter according to a ninth embodiment of the present invention;

FIG. 15 is a cross-sectional view of a main portion of a fuel filter according to a tenth embodiment of the present invention;

FIG. 16 is a cross-sectional view of a main portion of a fuel filter according to an eleventh embodiment of the present invention;

DETAILED DESCRIPTION OF PREFERRED EMBODIMENTS

First Embodiment

Figure 1:
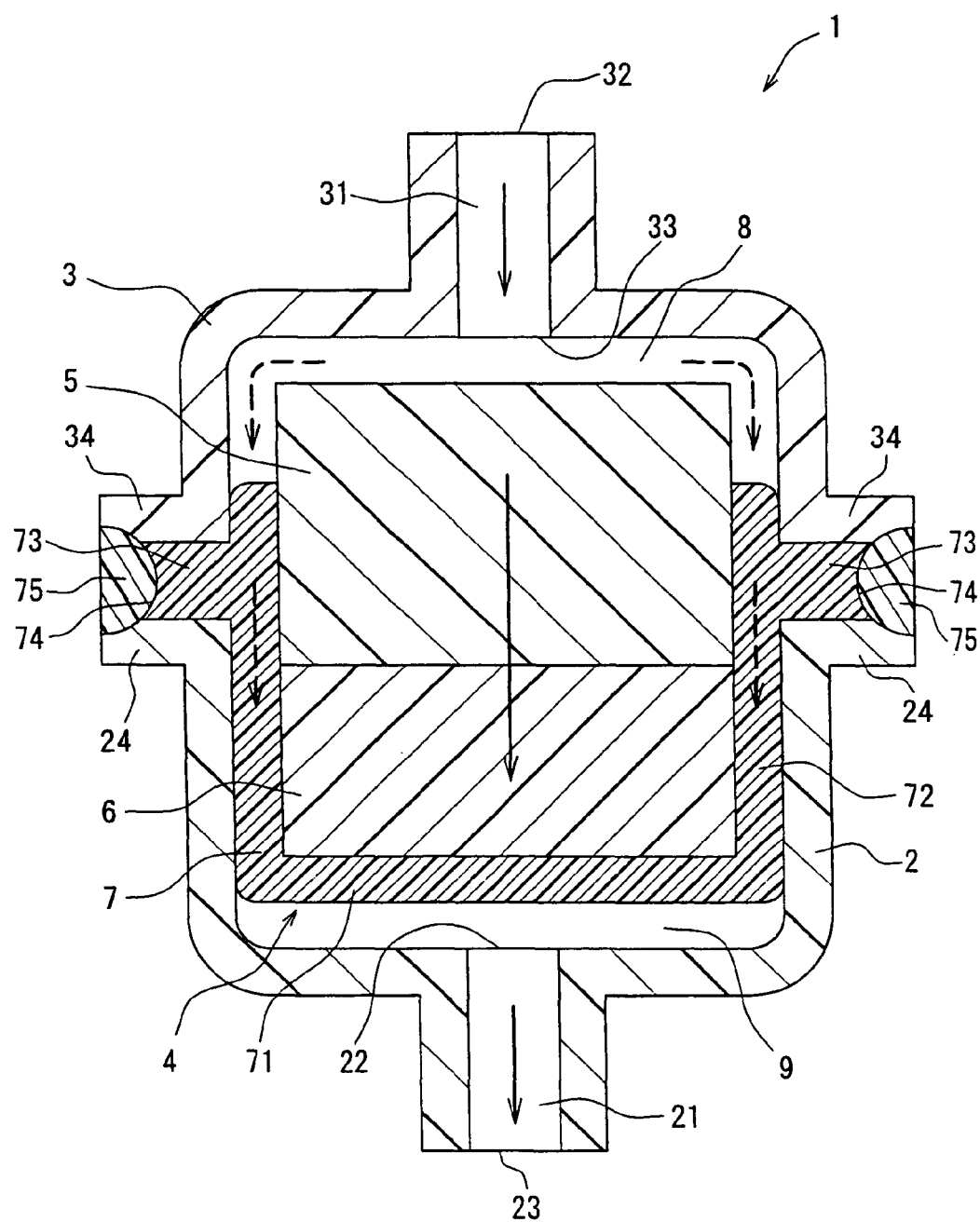
FIG. 1 is a cross-sectional view of a fuel filter according to a first embodiment of the present invention.

A case, in which a filter of the present invention is used as a fuel filter applied to an internal combustion engine mounted in an automobile, will be described. FIG. 1 is a cross-sectional view showing a fuel filter 1 according to this embodiment. The fuel filter 1 is provided midway through a fuel piping for capturing foreign matters contained in fuel. The fuel piping connects a fuel tank (not shown) with a fuel injection device of an internal combustion engine (not shown). The fuel filter 1 is constructed of a case 2, a cap 3, and a filtering member 4.

The case 2 (corresponding to a first support member) is formed of polyacetal resin in the shape of a circular cylinder having a closed end. The case 2 has a discharge passage 21 substantially in the center of the closed end. The discharge passage 21 axially extends from an inlet portion 22 of the bottom portion of the case 2. Fuel piping (not shown) is connected to an outlet portion 23 of the discharge passage 21 to extend toward the fuel injection device of the internal combustion engine.

The cap 3 (corresponding to a second support member) is formed of the polyacetal resin in the shape of a circular cylinder having a closed end. The cap 3 has an inflow passage 31 substantially in the center of the closed end. The inflow passage 31 axially extends from an inlet portion 33 opened in the upper end of the cap 3. Fuel piping (not shown) connected to a fuel tank extends toward an inlet portion 32 of the inflow passage 31.

The filtering member 4 is housed in a space formed when the cap 3 is butted against the case 2. The filtering member 4 is formed of a nonwoven fabric made by three-dimensionally tangling fibers of polyacetal resin to have a number of flow pores allowing fuel to flow therethrough. Fuel flowing from the inflow passage 31 contains foreign matters. The fibers capture the foreign matters, which are larger in size than the flow pores, thereby separating the foreign matters from fuel. The fuel removed of the foreign matters is discharged from the discharge passage 21.

In this embodiment, the filtering member 4 is formed of the polyacetal resin having durability to the fuel, so that the filtering member 4 can be restricted from deterioration caused by fuel. Thus, the filtering member 4 can be enhanced in lifetime. Moreover, in this embodiment, the case 2 and the cap 3 are also formed of the same polyacetal resin similarly to the filtering member 4, so that recycling of the case 2, the cap 3, and the filtering member 4 can be facilitated.

In this embodiment, the filtering member 4 is constructed of three layers of a rough layer 5 (corresponding to a rough part), an intermediate layer 6, and a dense layer 7 (corresponding to a dense part). The layers 5, 6, and 7 are axially stacked. These layers 5, 6, and 7 are classified by the density of the flow pores per unit volume. The layer having the highest density of the flow pores is the dense layer 7, and the layer having the lowest density of the flow pores is the rough layer 5. As the density of the flow pores becomes higher, the flow pores become smaller in diameter. Therefore, the flow pores become finer in mesh, thereby capable of capturing smaller foreign matters.

In this embodiment, the rough layer 5 formed in the substantially circular cylindrical shape is provided in a portion closest to the outlet portion 33 of the inflow passage 31. In addition, the intermediate layer 6 formed in the substantially circular cylindrical shape is provided below the rough layer. That is, the intermediate layer 6 is provided downstream of the rough layer 5 with respect to the direction of the flow of the fuel. The dense layer 7 has a dense layer bottom portion 71 substantially in the shape of a circular disk. The dense layer 7 has a dense layer side wall portion 72 formed in a substantially circular cylindrical shape and extended in the axial direction from the outer periphery of the dense layer bottom portion 71. The dense layer bottom portion 71 is provided downstream of the intermediate layer 6 in the flow of the fuel. The dense layer side wall portion 72 is provided so as to cover the side wall of the intermediate layer 6 and part of the side wall of the rough layer 5. The dense layer bottom portion 71 is opposed to the inlet portion 22 of the discharge passage 21.

Next, the structure of the filtering member 4 for supporting the case 2 and the cap 3 will be described. In this embodiment, the filtering member 4 is supported by being applied with mechanical pressure in the axial direction. The mechanical pressure is produced when the cap 3 is butted against the case 2. A dense layer projecting portion 73 is pinched by a flange portion 24 and a flange portion 34. And then, both the flange portions 24, 34 are fixed. Thus, the filtering member 4 is supported. The dense layer projecting portion 73 projects in the radial direction from the entire periphery of the dense layer side wall portion 72. The flange portion 24 projects in the radial direction from the entire periphery of the end portion of the case 2. The flange portion 34 projects in the radial direction from the entire periphery of the end portion of the cap 3. By supporting the dense layer 7 in this manner, the filtering member 4 is restricted from being moved in the axial and radial directions. A structure for fixing the case 2 and the cap 3 will be described later.

The dense layer projecting portion 73 is higher in the density of the flow pores and in a mechanical strength than the other portions such as the rough layer 5 and the intermediate layer 6 in the filtering member 4. In this structure, even when the dense layer projecting portion 73 is pinched by a specific mechanical pressure by both the flange portions 24, 34, the dense layer projecting portion 73 can secure the ability of sealing between the filtering member 4, the inner walls of the case 2, and the cap 3, without impairing the filtering function of the dense layer side wall portion 72. According to this embodiment, an adhesive used in the related art for securing the ability of sealing between the filtering member, the case, and the cap is not required. Thus, the number of components of the fuel filter 1 can be reduced.

Moreover, the dense layer projecting portion 73 is a portion having the highest density of the flow pores in the filtering member 4, so that has higher mechanical strength. Therefore, the dense layer projecting portion 73 is capable of steadily supporting the filtering member 4, the case 2, and the cap 3. Moreover, the filtering member 4 has the dense layer projecting portion 73 pinched between the case 2 and the cap 3, thereby being supported by the case 2 and the cap 3. Thus, the filtering member 4 can be easily positioned in the axial direction.

In the related art, the adhesive may be excessively supplied, and consequently, the adhesive may be impregnated into part of the filtering member, or may be oozed out into a portion, in which the fuel is supposed to flow under normal circumstances. As a result, the filtering member cannot be sufficiently utilized, and a filtering area may be reduced. By contrast, in this embodiment, an adhesive is not used, and such a problem can be restricted. In this embodiment, the dense layer 7 supported by the case 2 and the cap 3 has the filtering function, thereby increasing the filtering area of the filtering member 4. Thus, the performance of removing the foreign matters is enhanced.

Still further, in this embodiment, the performance of removing the foreign matters of the filtering member 4 can be enhanced, so the size of the fuel filter 1 can be reduced as compared with a filtering member in the related art having the same performance of removing the foreign matters. Still further, the filtering member 4 is supported by the case 2 and the cap 3 without using an adhesive. Therefore, viscosity and amount of an adhesive need not be managed. In addition, time period for drying the adhesive can be eliminated in manufacturing of the fuel filter 1. Thus, this embodiment provides also the advantage of reducing production cost.

Next, the structure of fixing the case 2 and the cap 3 will be described. In this embodiment, the case 2 and the cap 3 are fixed by flowing melted resin into a groove 74 formed when the dense layer projecting portion 73 is pinched between the case 2 and the cap 3. The axial end surfaces of both the flange portions 24, 34 and the radial end surface of the dense layer projecting portion 73 define the groove 74. When the melted resin is flowed into the groove 74, the axial end surfaces of both the flange portions 24, 34 and the radial end surface of the dense layer projecting portion 73 are melted by the heat of the melted resin. When the melted resin flowed into the groove 74 is cooled and solidified to form a cover portion 75, three components of the case 2, the cap 3, and the dense layer projecting portion 73 are melted and bonded to each other, thereby being rigidly fixed.

In this regard, the dense layer projecting portion 73 is extended in the radial direction from the dense layer side wall portion 72. Therefore, even when the dense layer projecting portion 73 is melted by the melted resin, the filtering function of the dense layer side wall portion 72 can be maintained.

Next, the operation of the fuel filter 1 constructed in the manner described above will be described. The fuel flowing from the fuel tank through the inflow passage 31 flows into an inflow space 8 between the rough layer 5 and the inflow passage 31.

Most of the fuel flowing into the space 8 flows into the rough layer 5, as shown by a solid arrow in FIG. 1. In the rough layer 5, the foreign matters larger than the sizes of the flow pores formed in the rough layer 5 are captured. The fuel containing foreign matters not captured by the rough layer 5 flows into the intermediate layer 6 provided downstream of the rough layer 5 in the fuel flow direction. In this regard, the fuel flowing between the side wall of the rough layer 5 and the cap 3 will be described later.

In the intermediate layer 6, the foreign matters, which is smaller than the foreign matters captured by the rough layer 5 and larger than the sizes of the flow pores formed in the intermediate layer 6, are captured. The fuel containing the foreign matters not captured by the intermediate layer 6 further flows into the dense layer bottom portion 71 of the dense layer 7 provided downstream of the intermediate layer 6 in the fuel flow direction.

In the dense layer bottom portion 71, the foreign matters larger than the sizes of the flow pores in this bottom portion 71 are captured. In the dense layer bottom portion 71, very small foreign matters are captured here, and are separated from the fuel. The fuel flowing through the dense layer bottom portion 71 once flows into a discharge space 9 between the dense layer bottom portion 71 and the discharge passage 21, and then the fuel is discharged through the discharge passage 21.

In this structure, the density of the flow pores of the filtering member 4 is gradually increased from the upstream to the downstream in the fuel flow direction, that is, in the order of the rough layer 5, the intermediate layer 6, and the dense layer bottom portion 71. In this structure, the foreign matters can be efficiently removed from the fuel, and the life of the filtering member 4 can be elongated.

Most of the fuel flowing into the inflow space 8 flows into the rough layer 5 but part of the fuel flowing into the inflow space 8 flows between the side wall of the rough layer 5 and the cap 3. The fuel flowing between the side wall of the rough layer 5 and the cap 3, as shown by broken arrows in FIG. 1, flows into the dense layer side wall portion 72. As described above, the dense layer projecting portion 73 formed in the dense layer side wall portion 72 is pinched by the case 2 and the cap 3 to secure the sealing capability. Therefore, the fuel flowing along the outer periphery of the rough layer 5 does not flow through the boundary between the dense layer side wall portion 72 and the case 2 and the cap 3, but flows through the dense layer side wall portion 72.

In the fuel flowing into the dense layer side wall portion 72, the foreign matters larger than the sizes of the flow pores in this dense layer side wall portion 72 are captured. Foreign matters of comparatively large sizes to very small sizes can be captured from the fuel flowing into the dense layer side wall portion 72. The fuel flowing through the dense layer side wall portion 72 flows into the discharge space 9, and is discharged through the discharge passage 21 together with the fuel having passed through the rough layer 5, the intermediate layer 6, and the dense layer bottom portion 71.

In this regard, in this embodiment, the filtering member 4 has the sizes of the flow pores changed stepwise in the order of the rough layer 5, the intermediate layer 8, and the dense layer 7. Alternatively, the filtering member 4 may have the sizes of flow pores changed gradually from the upstream to the downstream in the fuel flow direction. In the above structure of the filtering member 4, the filtering member 4 can further enhance the performance of removing of foreign matters, and can further elongate its life.

Second Embodiment

Next, a second embodiment of a structure for supporting the filtering member 4 and a structure for fixing the case 2 and the cap 3 will be described with reference to FIG. 2.

Figure 2:
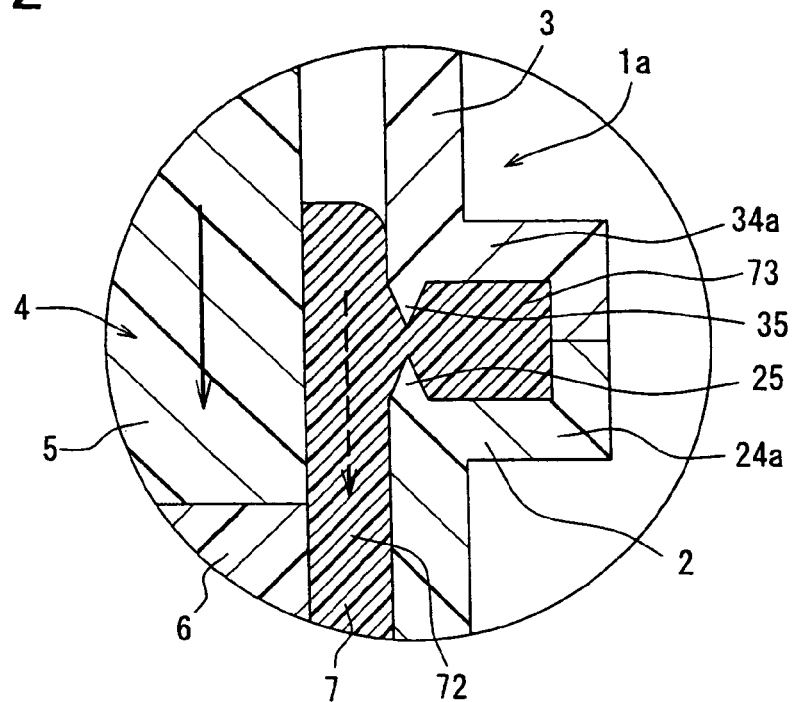
FIG. 2 is a cross-sectional view of a main portion of a fuel filter according to a second embodiment of the present invention.

FIG. 2 is a cross-sectional view of a main portion of a fuel filter 1*a* in the second embodiment. Only features of the second embodiment will be described here. In FIG. 2, the components and portions having the same functions as in the first embodiment are denoted by the same reference symbols as in the first embodiment.

As shown in FIG. 2, the case 2 has a flange portion 24*a* formed at the entire periphery of the end portion of the case 2 in such a way as to project in the radial direction. The end of the outer periphery of the flange portion 24*a* has a side wall portion extending in the axial direction toward the cap 3. The end of the inner periphery of the flange portion 24*a* has a protrusion 25 extending similarly in the axial direction toward the cap 3.

The end portion of the cap 3 has a flange portion 34*a* projecting in the radial direction from the entire periphery of the end portion of the cap 3. The end of the outer periphery of the flange portion 34*a* has a side wall portion extending toward the flange portion 24*a* of the case 2 so as to be opposed to the side wall portion of the case 2. The end of the inner periphery of the flange portion 34*a* has a protrusion 35 extending toward the flange portion 24*a* of the case 2.

The dense layer side wall portion 72 has the dense layer projecting portion 73 formed therein, similarly to the first embodiment. The dense layer projecting portion 73 is pinched between both the flange portions 24*a*, 34*a*, thereby being supported by the flange portions 24*a*, 34*a*. The side wall portions of both the flange portions 24*a*, 34*a* are butted against each other, and then are heated. Thus, the case 2 and the cap 3 are melted and bonded to each other. Thus, the case 2 and the cap 3 are fixed to each other.

In this embodiment, the protrusions 25, 35 opposed to each other are formed at both the flange portions 24*a*, 34*a*. Therefore, a comparatively high mechanical pressure can be applied to the dense layer projecting portion 73 in a condition where both the flange portions 24*a*, 34*a* are butted against each other. With this structure, the sealing property of the filtering member 4, the case 2, and the cap 3 can be improved.

Third Embodiment

Next, a third embodiment of a structure for supporting the filtering member 4 and a structure for fixing the case 2 and the cap 3 will be described with reference to FIG. 3.

Figure 3:
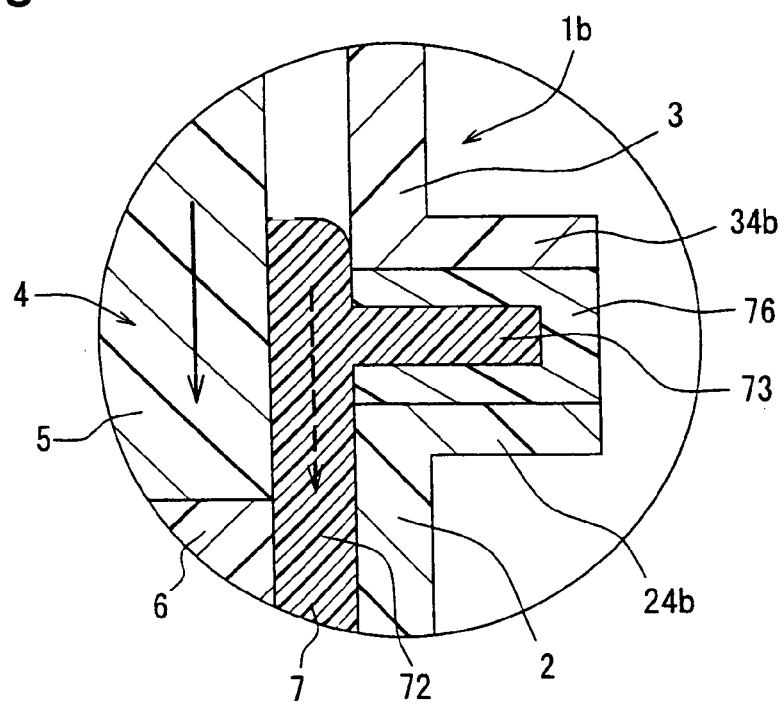
FIG. 3 is a cross-sectional view of a main portion of a fuel filter according to a third embodiment of the present invention.

FIG. 3 is a cross-sectional view of a main portion of a fuel filter 1b in the third embodiment. Only features of the third embodiment will be described here. In FIG. 3, the components and portions having the same functions as in the first embodiment are denoted by the same reference symbols as in the first embodiment.

In this embodiment, as shown in FIG. 3, a resin cover 76 for covering the dense layer projecting portion 73 is pinched between both flange portions 24b, 34b, which are formed respectively on the case 2 and the cap 3, whereby the filtering member 4 is supported. The dense layer projecting portion 73 and the cover 76 are heated, thereby being melted and bonded to each other. The cover 76 and both the flange portions 24b, 34b are also heated, thereby being melted and bonded to each other.

According to this construction, the dense layer projecting portion 73 is covered with the cover 76. Therefore, the fuel can be restricted from flowing through the dense layer side wall portion 72 into the dense layer projecting portion 73. Thus, the fuel can be restricted from leaking through a radial end surface of the dense layer projecting portion 73.

Fourth Embodiment

Next, a fourth embodiment of a structure for supporting the filtering member 4 and a structure for fixing the case 2 and the cap 3 will be described with reference to FIGS. 4, 5.

Figure 4:
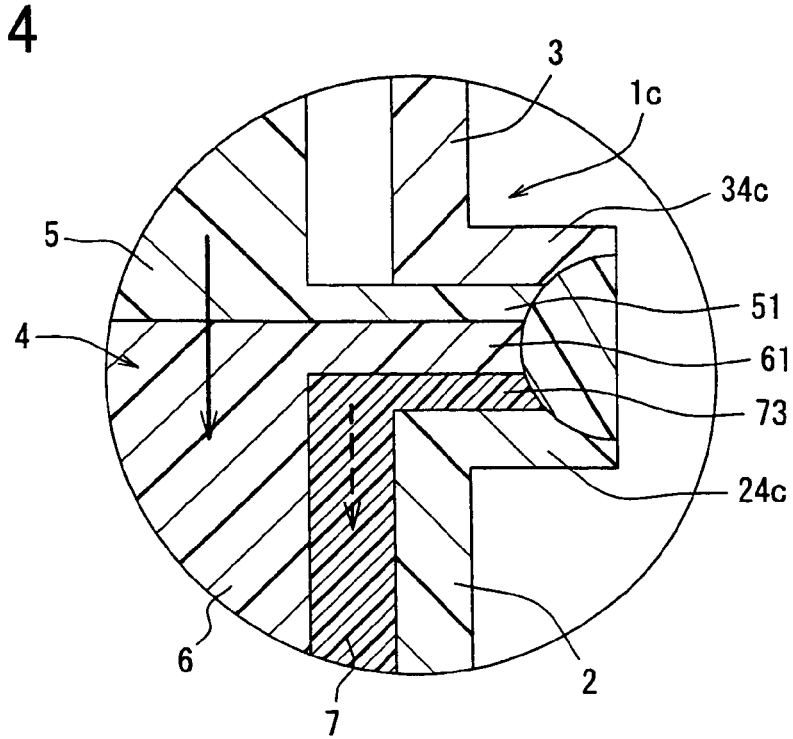
FIG. 4 is a cross-sectional view of a main portion of a fuel filter according to a fourth embodiment of the present invention.
Figure 5:
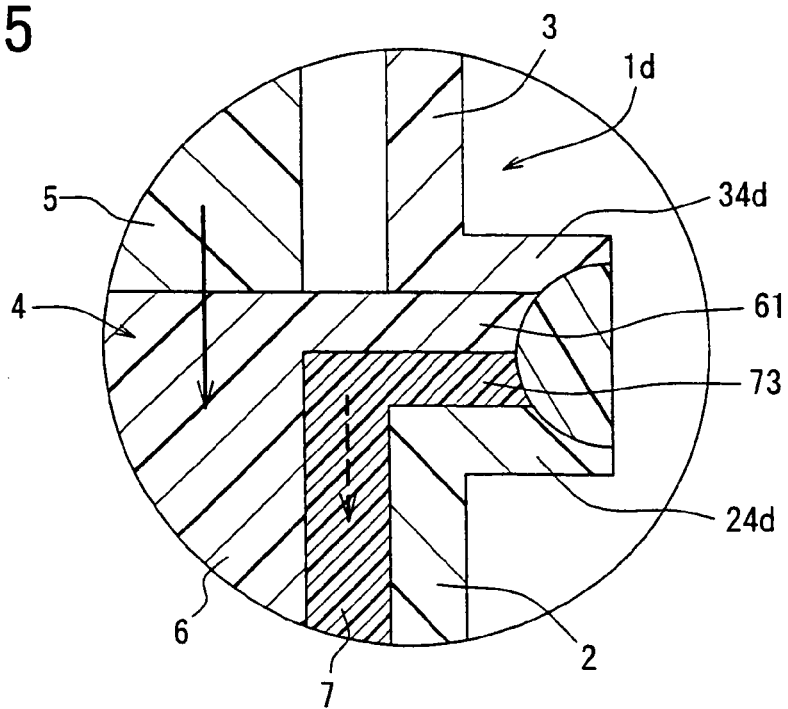
FIG. 5 is a cross-sectional view of a main portion showing another embodiment of the fuel filter according to the fourth embodiment of the present invention.

FIG. 4 and FIG. 5 are cross-sectional views of a main portion of a fuel filter 1c and a main portion of a fuel filter 1d in the fourth embodiment, respectively. Only features of the fourth embodiment will be described here. In FIGS. 4, 5, the components and portions having the same functions as in the first embodiment are denoted by the same reference symbols as in the first embodiment.

As shown in FIG. 4, the flange portion 24c is formed at the case 2, and the flange portion 34c is formed at the cap 3. The filtering member 4 is pinched between the flange portion 24c and the flange portion 34c. In the filtering member 4, not only the dense layer projecting portion 73 but also the rough layer projecting portion 51 and the intermediate layer projecting portion 61 are pinched between the flange portion 24c and the flange portion 34c. The rough layer projecting portion 51 is formed in the rough layer 5. The intermediate layer projecting portion 61 is formed in the intermediate layer 6. The fixing structure of the case 2 and the cap 3 is the same as the fixing structure in the first embodiment (FIG. 1), so the description of the fixing structure will be omitted.

In this manner, the rough layer projecting portion 51, the intermediate layer projecting portion 61, and the dense layer projecting portion 73 are stacked and pinched between both the flange portions 24c, 34c, whereby the rough layer 5, the intermediate layer 6, and the dense layer 7 are supported further rigidly. Moreover, as shown in FIG. 5, only the dense layer projecting portion 73 and the intermediate layer projecting portion 61 may be pinched between both the flange portions 24c, 34c.

Fifth Embodiment

Next, a fifth embodiment of a structure for supporting the filtering member 4 and a structure for fixing the case 2 and the cap 3 will be described with reference to FIGS. 6, 7.

Figure 6:
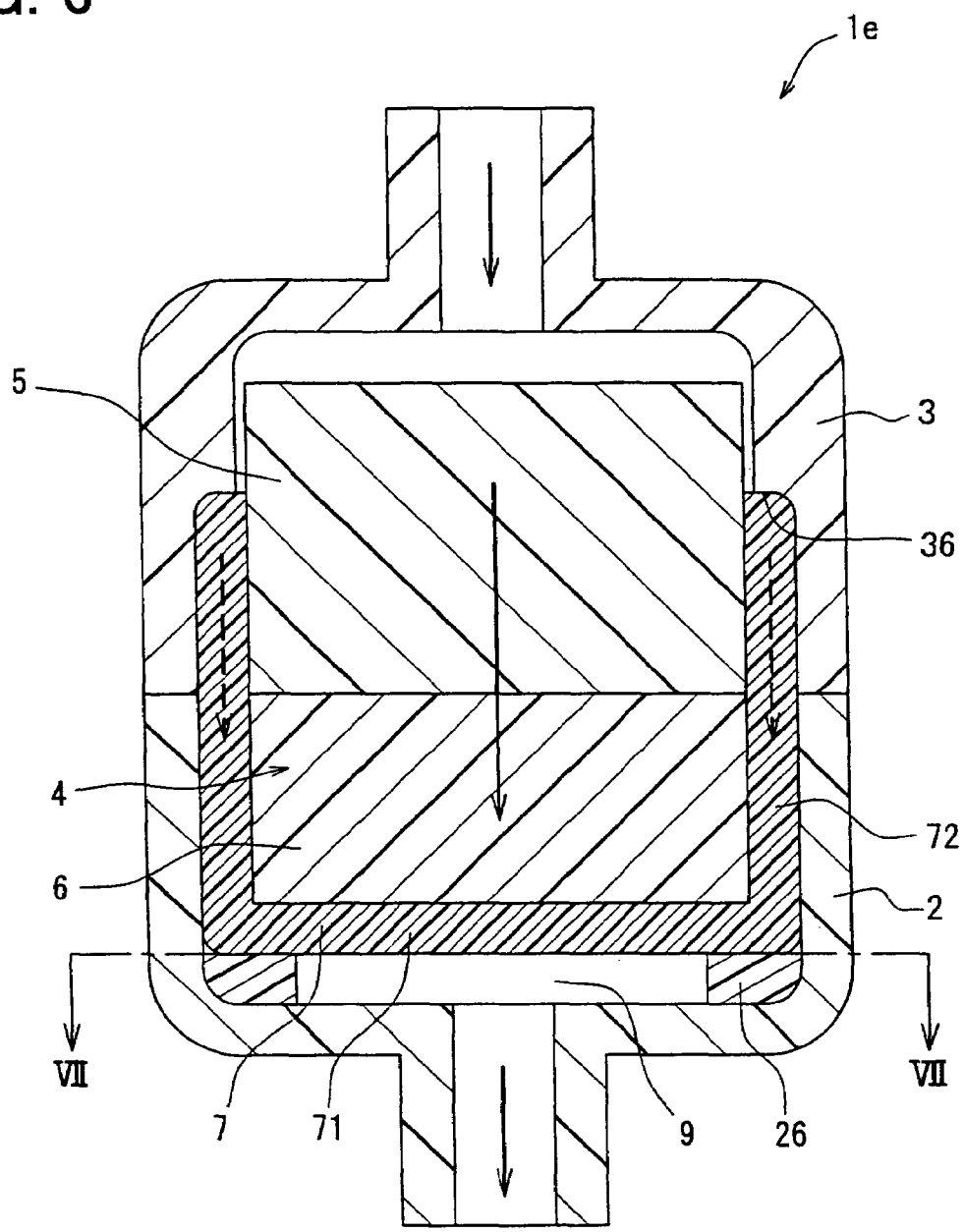
FIG. 6 is a cross-sectional view of a fuel filter according to a fifth embodiment of the present invention.
Figure 7:
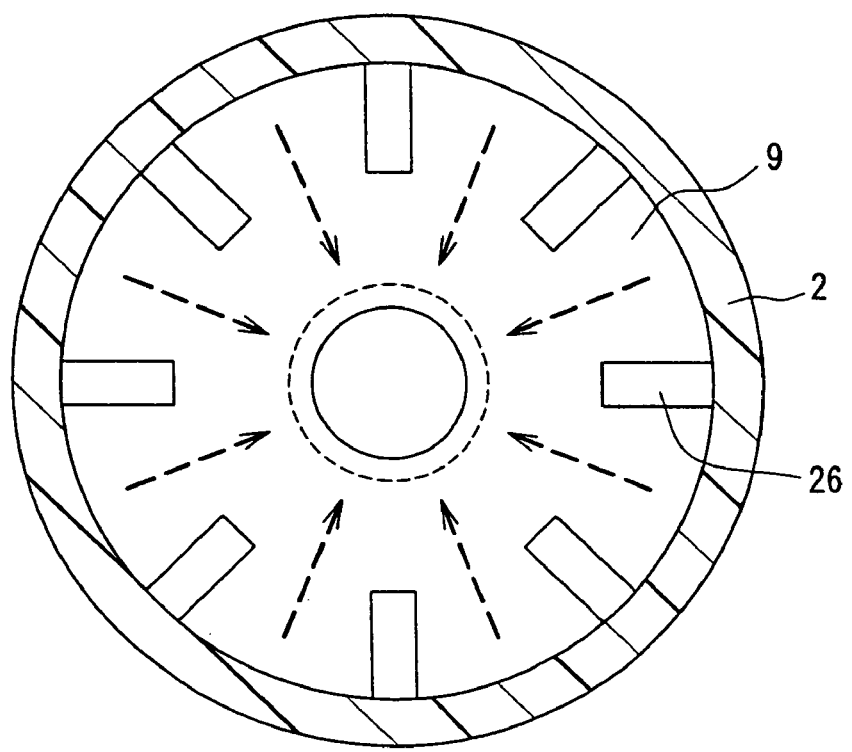
FIG. 7 is a cross-sectional view along a line VII-VII in FIG. 6.

FIG. 6 is a cross-sectional view of a fuel filter 1e according to the fifth embodiment, and FIG. 7 is a cross-sectional view along a line VII-VII in FIG. 6. In FIGS. 6, 7, components and portions having the same functions as in the first embodiment will be denoted by the same reference symbols as in the first embodiment.

As shown in FIGS. 6, 7, multiple ribs 26 for supporting the dense layer bottom portion 71 are formed at the bottom portion of the case 2. An annular step portion 36 for supporting the top end surface of the dense layer side wall portion 72 is formed at the inner wall of the cap 3.

As shown in FIG. 6, by butting the cap 3 against the case 2, the dense layer 7 is pinched and supported by the ribs 26 and the step portion 36. The case 2 and the cap 3 are heated, thereby being melted and bonded to each other.

In this embodiment, the dense layer bottom portion 71 is supported by the multiple ribs 26, so the fuel flowing into the discharge space 9 through the dense layer side wall portion 72 can flow through the ribs 26 neighboring to each other without being blocked, as shown by broken arrows in FIG. 7. In this structure, the flow resistance of the filtering member 4 can be restricted from increasing, as compared with a structure where the ribs 26 are formed in a ring-shape.

Figure 8:
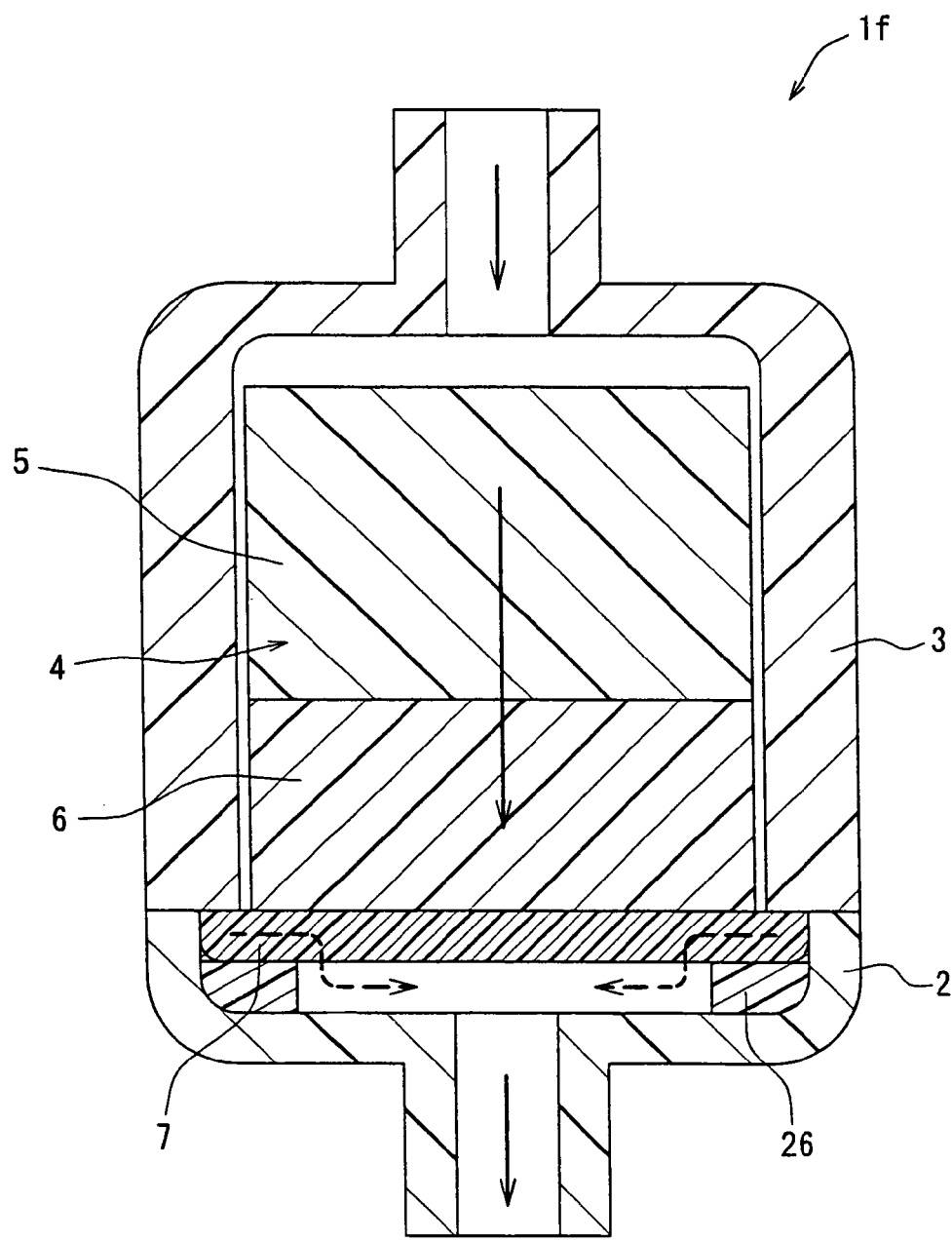
FIG. 8 is a cross-sectional view showing another embodiment of the fuel filter according to the fifth embodiment of the present invention.

Alternatively, in a fuel filter 1f as shown in FIG. 8, a dense layer 7 substantially in the shape of a circular disk may be pinched and supported between the end surface of the cap 3 and the ribs 26 of the case 2. In this structure, the shape of the dense layer 7 can be made simple so that an increase in production cost can be restricted.

Sixth Embodiment

Next, a structure, which supports the filtering member 4 and is different from the structures described in the embodiments, will be described with reference to FIG. 9.

Figure 9:
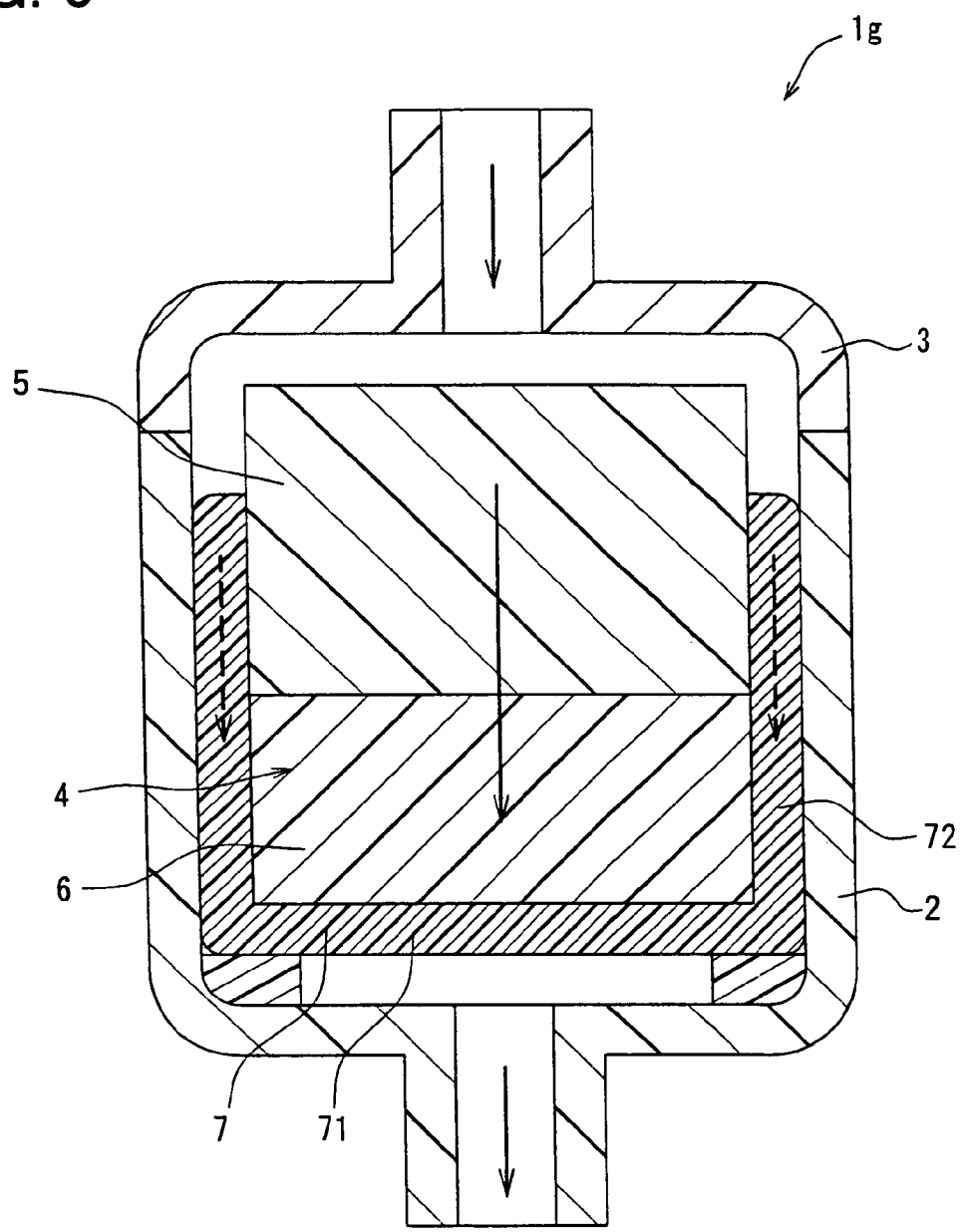
FIG. 9 is a cross-sectional view of a fuel filter according to a sixth embodiment of the present invention.

FIG. 9 is a cross-sectional view of a fuel filter 1g in a sixth embodiment. Only features of the sixth embodiment will be described here. In FIG. 9, components and portions having the same functions as in the first embodiment will be denoted by the same reference symbols as in the first embodiment.

The support structure in this embodiment is the same as the support structure in the first to fifth embodiments in that the filtering member 4 is supported by a mechanical pressure applied by the case 2 and the cap 3. However, the support structure in this embodiment is different from the support structure in the direction in which the mechanical pressure is applied to the filtering member 4 by the case 2 and the cap 3. In other words, in the first to fifth embodiments, the filtering member 4 is supported by the mechanical pressure applied in the axial direction by the case 2 and the cap 3, whereas in this embodiment, the filtering member 4 is supported by the mechanical pressure applied in the radial direction by the case 2 and the cap 3.

The dense layer 7 has a dense layer bottom portion 71 and a dense layer side wall portion 72. The dense layer bottom portion 71 is formed in the shape of a substantially circular disk. The dense layer side wall portion 72 is formed in the shape of a substantially circular cylinder and extending in the axial direction from the dense layer bottom portion 71. The rough layer 5 and the intermediate layer 6, as shown in FIG. 9, are stacked on the dense layer bottom portion 71 in the axial direction in the order of the intermediate layer 6 and the rough layer 5. The rough layer 5 and the intermediate layer 6 are housed in the dense layer 7 in such a way that part of the rough layer 5 and the side wall of the intermediate layer 6 are covered with the dense layer side wall portion 72.

The filtering member 4 of an integration of the rough layer 5, the intermediate layer 6, and the dense layer 7 is pressed into the case 2, thereby being supported by the case 2. The dense layer side wall portion 72 located on the outermost peripheral side of the filtering member 4 is applied with mechanical pressure in the radial direction from the case 2. The dense layer side wall portion 72 has a comparatively high mechanical strength. Therefore, even when the dense layer side wall portion 72 is applied with the mechanical pressure in the radial direction, the dense layer side wall portion 72 can secure the sealing property between the filtering member 4 and the inner wall of the case 2, without impairing a filtering function.

Moreover, in this embodiment, the dense layer projecting portion 73 need not be formed at the dense layer side wall portion 72, dissimilarly to the first to fourth embodiments, so the structure of the dense layer 7 can be made simple so that an increase in production cost can be restricted.

Seventh Embodiment

Figure 10:
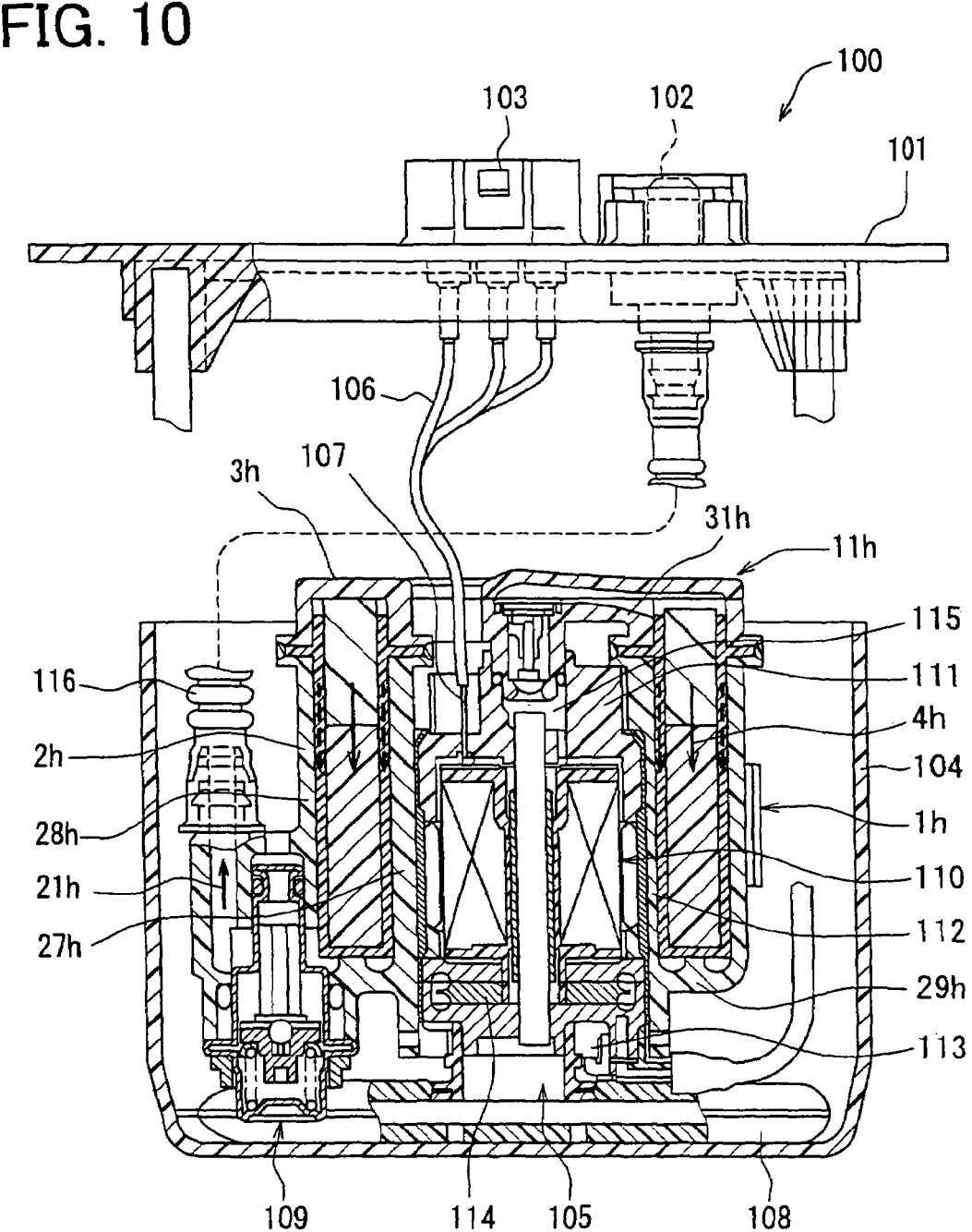
FIG. 10 is a cross-sectional view of a fuel feed apparatus to which a fuel filter according to a seventh embodiment of the present invention is applied.

Next, a case will be described in which a filter of the present invention is used as a fuel filter and in which the fuel filter is applied to an in-tank type fuel feed apparatus. FIG. 10 shows a cross-sectional view of an in-tank type fuel feed apparatus.

A mounting member 101 of a fuel feed apparatus 100 is formed in the shape of a circular disk, and is retained by and mounted on the top wall of a fuel tank (not shown) integrally formed of resin. Components of the fuel feed apparatus 100 other than the mounting member 101 are housed in the fuel tank.

A fuel discharge pipe 102 and an electric connector 103 are integrally molded of resin with the mounting member 101. The fuel discharge pipe 102 is provided for discharging fuel discharged from a fuel pump 105 housed in a sub-tank 104 to the outside of the fuel tank. The electric connector 103 is electrically connected to a terminal portion 107 of the fuel pump 105 via a lead wire 106 and a power supply connector (not shown) to supply electric power to the fuel pump 105.

The sub-tank 104 is not hermetically sealed but is opened upward. The sub-tank 104 houses a suction filter 108, a pressure regulator 109, the fuel pump 105, and a fuel filter 1h. The suction filter 108 captures comparatively large foreign matters contained in the fuel drawn from the sub-tank 104 using the fuel pump 105. The pressure regulator 109 regulates the pressure of the fuel discharged from the fuel pump 105 to a specific pressure.

The fuel pump 105 has a motor 110 mounted therein for producing a fuel suction force by the rotation of the motor 110. The top of the fuel pump 105 is covered with a resin cover 111. The motor 110 is housed in a case 112. The case 112 is made of metal and provided around the outer periphery of the motor 110. The resin cover 111 is fixed by crimping the case 112. The fuel pump 105 draws fuel flowing from a suction port 113 provided on the side of the suction filter 108 through the suction filter 108. The fuel pump 105 pressurizes the fuel using an impeller 114, and then discharges the pressurized fuel through a discharge port 115.

Part of the fuel pressurized by the fuel pump 105 is injected from a nozzle part (not shown) provided outside the bottom of the sub-tank 104. The nozzle part injects the fuel toward a fuel inlet (not shown) formed in the sub-tank 104. Fuel in the fuel tank is drawn into the sub-tank 104 by a suction pressure produced at this time. The nozzle part for injecting part of the fuel pressurized by the fuel pump 105 constructs a so-called jet pump.

Figure 11:
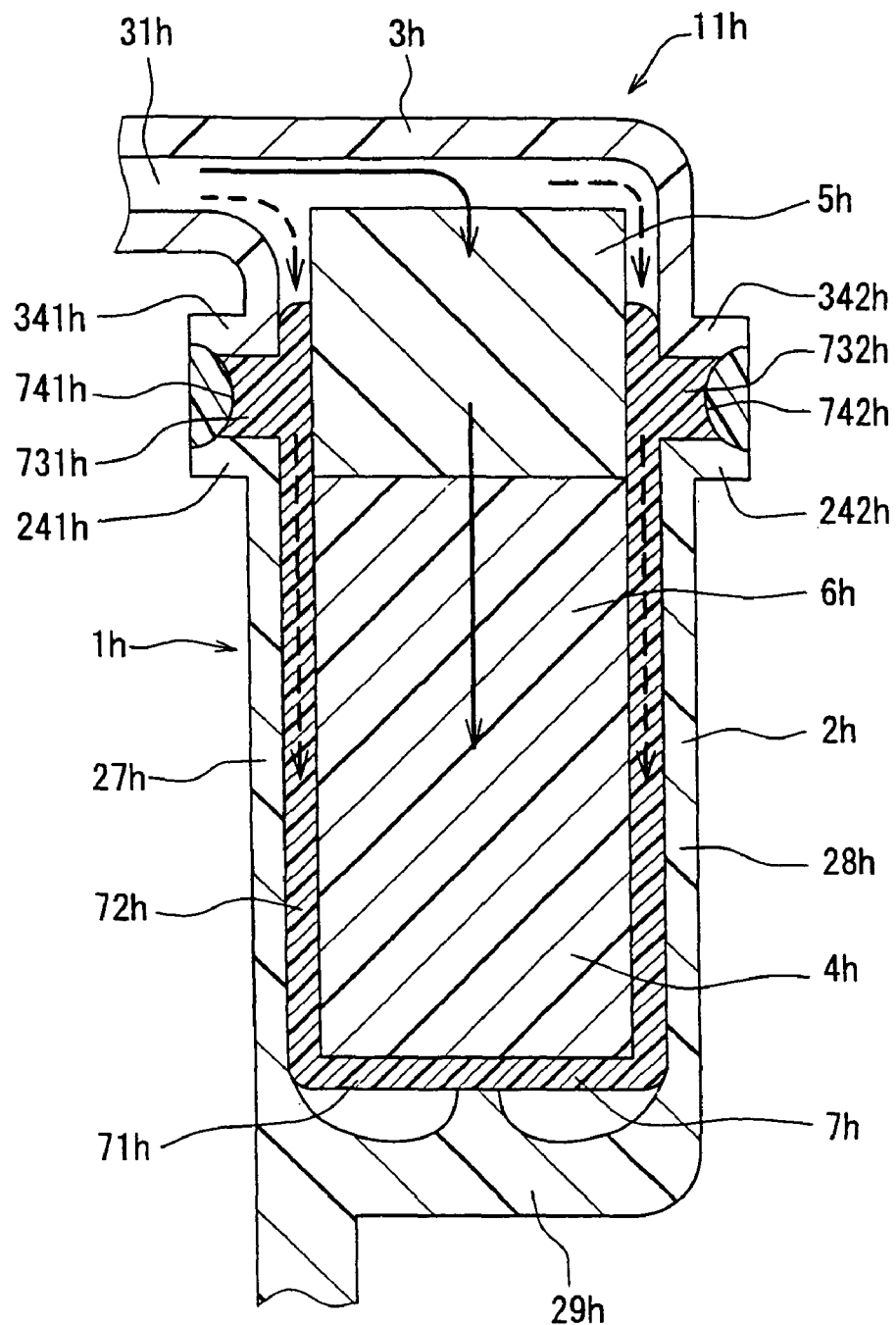
FIG. 11 is a cross-sectional view of a main portion of the fuel filter according to the seventh embodiment of the present invention.

The fuel filter 1h has a filter case 11h corresponding to a support member and a filtering member 4h. The filtering member 4h is housed in the filter case 11h. The filter case 11h has a case body 2h, which corresponds to a first support member, and a cap 3h, which corresponds to a second support member. The filter case 11h is formed in a cylindrical shape. As shown in FIGS. 10, 11, the case body 2h has an inner cylindrical portion 27h, an outer cylindrical portion 28h, and a bottom portion 29h. The inner cylindrical portion 27h surrounds the outer periphery of the fuel pump 105. The outer cylindrical portion 28h surrounds the outer periphery of the inner cylindrical portion 27h. The bottom portion 29h connects the inner cylindrical portion 27h with the outer cylindrical portion 28h. The filtering member 4h is housed in a space defined by the inner cylindrical portion 27h, the outer cylindrical portion 28h, and the bottom portion 29h.

As shown in FIG. 10, the cap 3h is provided on the side opposite to the bottom of the case body 2h. The cap 3h hermetically closes the case body 2h. The fuel discharged from the discharge port 115 of the fuel pump 105 flows through an inflow passage 31h, which is connected to the discharge port 115. The fuel further flows into the filtering member 4h, and passes through the filtering member 4h. The fuel passing through the filtering member 4h is in pressure regulated to a specific pressure using the pressure regulator 109, and then flows out through a discharge passage 21h of the filter case 11h. The fuel flowing out of the discharge passage 21h flows through a bellows pipe 116 and is discharged through the fuel discharge pipe 102.

Next, the fuel filter 1h will be described with reference to FIG. 11. The filer case 11h is molded of polyacetal resin. The filtering member 4h is also formed of polyacetal resin, similarly to the filter case 11h. The filtering member 4h is constructed of three layers of a rough layer 5h, an intermediate layer 6h, and a dense layer 7h, which are stacked in the axial direction, similarly to the plurality of embodiments described above.

The rough layer 5h is substantially in the shape of a circular ring, and is provided to the outlet of the inflow passage 31h. The intermediate layer 6h is provided below the rough layer 5h. The intermediate layer 6h is substantially in the shape of a circular ring. The dense layer 7h has a dense layer bottom portion 71h substantially in the shape of a circular ring and a dense layer side wall portion 72h. The dense layer side wall portion 72h extends in the axial direction from an inner peripheral end portion and an outer peripheral end portion of the dense layer bottom portion 71h. The dense layer bottom portion 71h is provided below the intermediate layer 6h. The dense layer side wall portion 72h are provided so as to cover the side wall of the intermediate layer 6h and part of the side wall of the rough layer 5h.

The dense layer side wall portion 72h on the inner peripheral side has a dense layer projecting portion 731h, which extends from the entire circumferential periphery toward the inner peripheral side. The dense layer side wall portion 72h on the outer peripheral side has a dense layer projecting portion 732h, which extends from the entire circumferential periphery toward the outer peripheral side.

The inner cylindrical portion 27h of the case body 2h has a flange portion 241h, which extends from the entire periphery toward the inner peripheral side. The outer cylindrical portion 28h of the case body 2h has a flange portion 242h, which extends from the entire periphery toward the outer peripheral side.

The cap 3h has a flange portion 341h, which extends from a portion abutted against the inner cylindrical portion 27h, toward the inner peripheral side. Moreover, the cap 3h has a flange portion 342h, which extends from a portion abutted against the outer cylindrical portion 28h, toward the outer peripheral side.

The filtering member 4h has the dense layer projecting portions 731h, 732h pinched between the flange portions 241h, 242h of the case body 2h and the flange portions 341h, 342h of the cap 3h. The flange portion 241h is fixed to the flange portion 341h, and the flange portion 242h is fixed to the flange portion 342h, so the filtering member 4h is supported by the case body 2h and the cap 3h.

Grooves 741h, 742h are formed when the dense layer projecting portions 731h, 732h are pinched. The flange portion 241h is fixed to the flange portion 341h, and the flange portion 242h is fixed to the flange portion 342h, by flowing melted resin in the grooves 741h, 742h. Melted resin is flowed into the grooves 741h, 742h, and then the flange portions 241h, 341h, 242h, and 342h, and the dense layer projecting portions 731h, 732h are partially melted. The melted resin is cooled and solidified, whereby three components of the case body 2h, the cap 3h, and the dense layer projecting portions 731h, 732h are rigidly fixed to each other.

Eighth Embodiment

Figure 12:
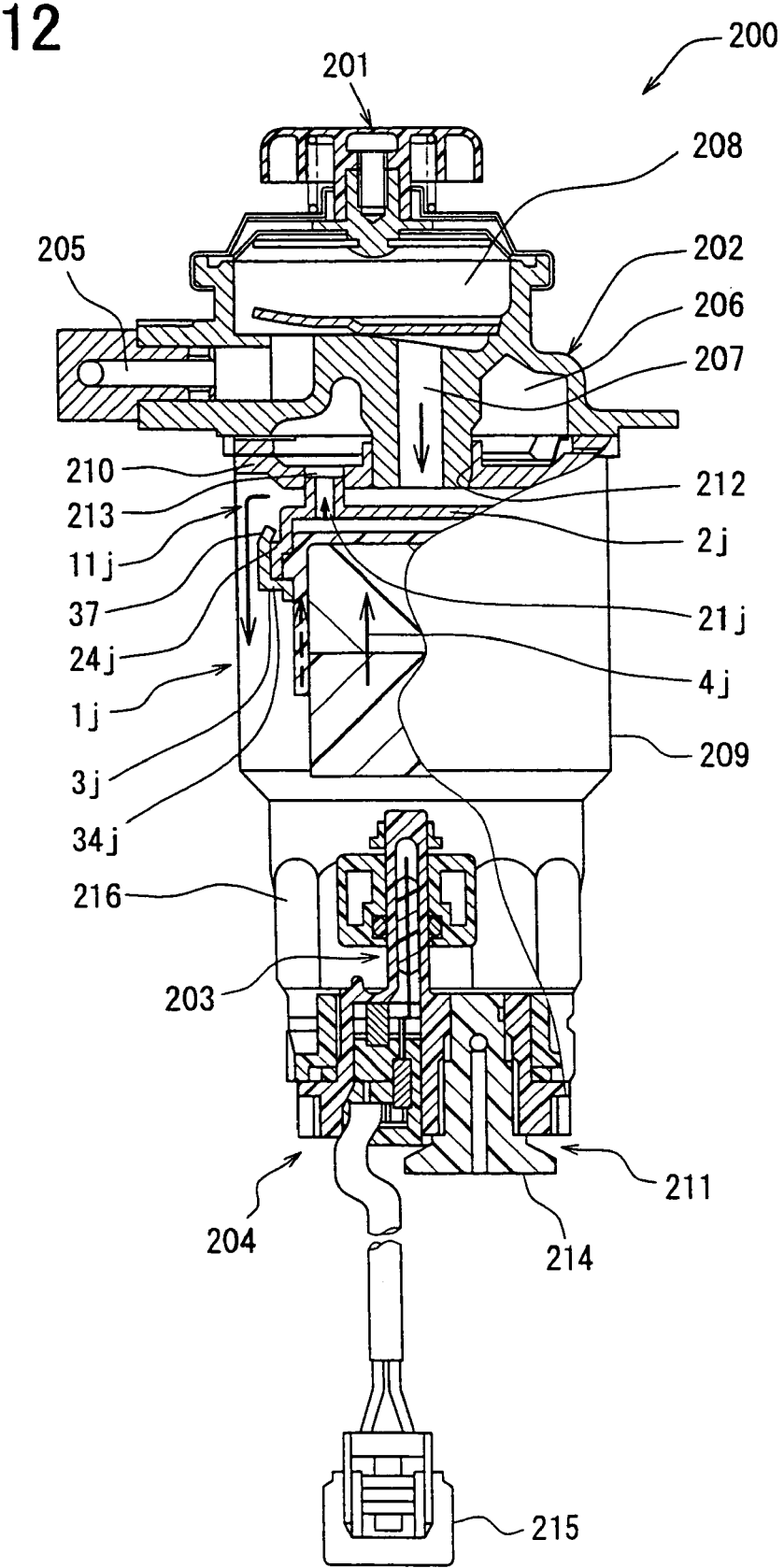
FIG. 12 is a cross-sectional view of a spin-on type filter to which a filter element according to an eighth embodiment of the present invention is applied.

Next, a structure, in which a filter is applied to a filter element of a spin-on type filter, will be described FIG. 12 is a cross-sectional view of a spin-on type filter. A spin-on type filter 200 is provided midway through a fuel supply pipe (not shown) provided for supplying fuel to a diesel internal combustion engine.

The spin-on type filter 200 is constructed of a filter part 1j, a cap 202, and a sensor part 204. The filter part 1j has a filter element (hereinafter simply referred to as "element") 4j mounted therein. The cap 202 is mounted on the internal combustion engine. The cap 202 has the filter part 1j mounted on its bottom portion, and has a hand pump 201. The sensor part 204 has a float-type sensor 203 mounted on the other end portion of the filter part 1j.

The cap 202 has an inlet 205, through which fuel flows in, an outlet 206, through which fuel flows out, and a fuel passage 207 for sending the fuel flowing in from the inlet 205 to the filter part 1j. The inlet 205 and the fuel passage 207 therebetween define a pump chamber 208 pressurized by using the hand pump 201.

The filter part 1j is constructed of a casing 209, an end plate 210, an element support plate 11j, a sensor portion support plate 211, and the element 4j. The element support plate 11j corresponds to a support member. The element 4j corresponds to a filtering member.

The end plate 210 is crimped and fixed to the peripheral edge portion on one end side of the casing 209. The end plate 210 has a through hole 212 substantially in the center thereof and a through hole 213 on the outer peripheral side of the through hole 212. The through hole 212 communicates with the fuel passage 207. The through hole 213 communicating with the outlet 206. The through hole 213 is mounted with the element support plate 11j. The through hole 213 also serves as a fuel passage.

The element support plate 11j has a first plate 2j and a cylindrical second plate 3j. The first plate 2j is formed in the shape of a cylinder having an inner diameter substantially equal to the outer diameter of the element 4j. The first plate 2j has a closed end. The first plate 2j corresponds to a first support member. The cylindrical second plate 3j corresponds to a second support member. The element support plate 11j pinches part of the element 4j to support the element 4j.

The first plate 2j has a discharge passage 21j and a flange portion 24j. The discharge passage 21j extends from a bottom portion of the first plate 2j toward the end plate 210. The discharge passage 21j is connected to the through hole 213. The flange portion 24j extends from an end portion of a side wall portion in the radial direction. The side wall portion extends from the bottom portion in a direction opposite to the end plate 210. The flange portion 24j covers part of the element 4j. The second plate 3j has a flange portion 34j and a crimped portion 37. The flange portion 34j extends from an end portion of the second plate 3j closer to the end plate 210 in the radial direction. The crimped portion 37 is formed at the tip of the flange portion 34j and is engaged with the flange portion 24j of the first plate 2j.

The sensor portion support plate 211 is formed in the shape of a cylinder having an outer diameter substantially equal to the inner diameter of the other end of the casing 209. The sensor portion support plate 211 is crimped and fixed to the casing 209. The sensor part 204 has the float-type sensor 203, a drain cock 214, and a connector 215. The sensor part 204 is supported by the sensor portion support plate 211.

Next, an operation of the spin-on type filter 200 will be described with reference to FIG. 12. As shown in FIG. 12, fuel containing foreign matters and flowing from a fuel supply pipe (not shown) into the inlet 205 flows through the pump chamber 208 and the fuel passage 207, and flows into the filter part 1j. The fuel flowing into the filter part 1j flows to the outer wall surface of the bottom portion of the element support plate 11j. Then, the fuel flows along the outer wall surface of the bottom portion to the outside in the radial direction. The fuel flows along the outer peripheral wall of the element support plate 11j, then passes through a boundary between the inner wall of the casing 209 and the side wall of the element 4j, and then flows into the element 4j.

The fuel flowing into the element 4j is removed of foreign matters through the element 4j, and is discharged through the discharge passage 21j formed in the first plate 2j. The fuel passing through the discharge passage 21j is discharged into the fuel supply pipe (not shown), after passing through the through hole 213 and the outlet 206. The fuel supply pipe is connected to the outlet 206.

When the fuel contains water, the water having a larger specific gravity is separated from the fuel by a difference in the specific gravity between the fuel and the water, so the separated water is collected in a chamber portion 216 located in the lower portion of the casing 209. The level of the water collected in the chamber portion 216 is monitored using the float type sensor 203 of the sensor part 204. The connector 215 outputs a sensor signal to an electronic control unit (not shown).

When the level of the water collected in the chamber portion 216 reaches a specific level, the electronic control unit informs an operator or the like of the diesel internal combustion engine of that the water level reaches the specific level, thereby urging the operator or the like to discharge the water collected in the chamber portion 216. This water can be discharged by opening the drain cock 214 and then by pressurizing the interior of the filter part 1j using the hand pump 201 located above the filter part 1j.

Figure 13:
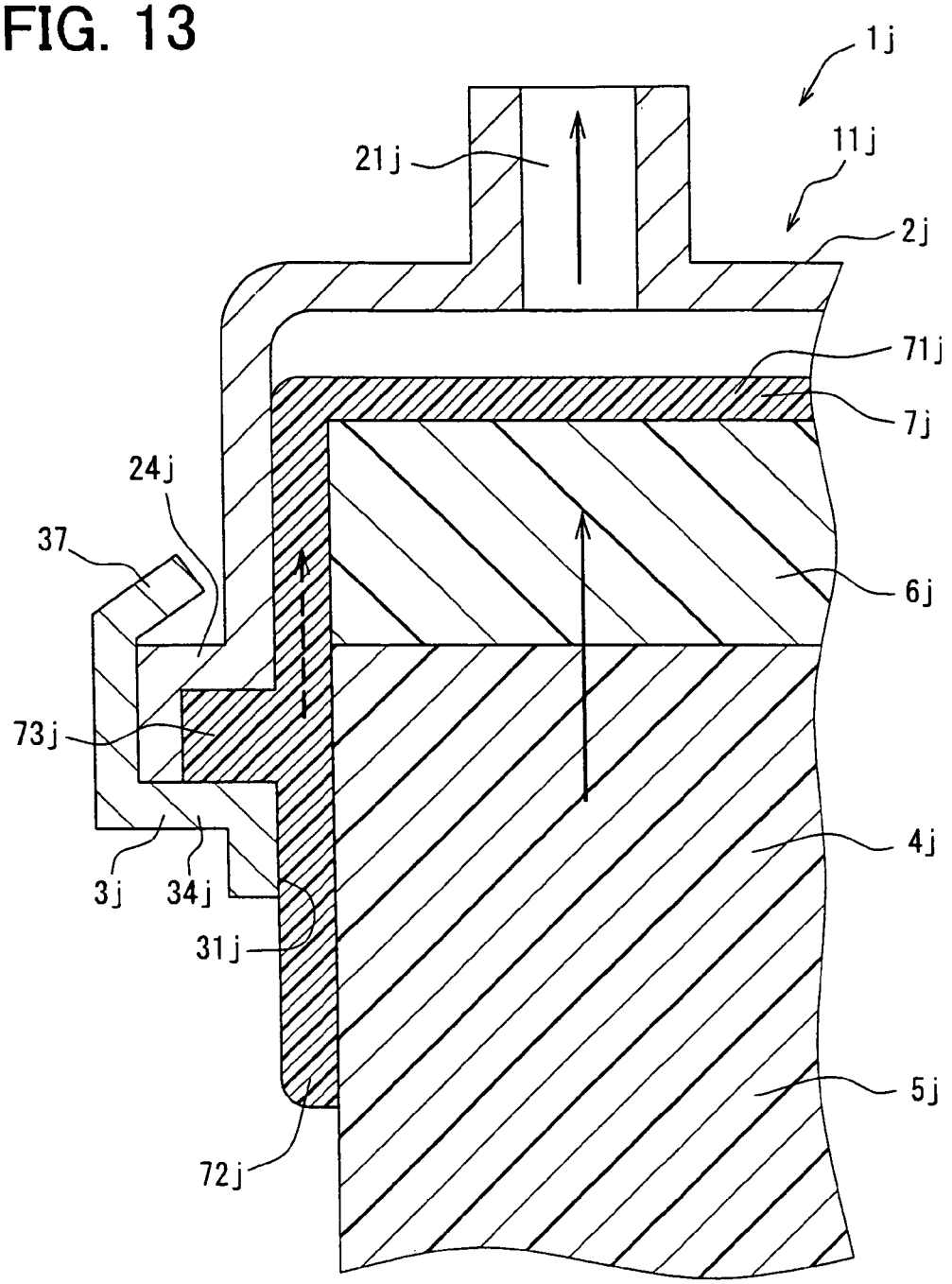
FIG. 13 is a cross-sectional view of a main portion of a filter element according to the eighth embodiment of the present invention.

Next, the element 4j will be described with reference to FIG. 13. The element 4j is constructed of three layers of a rough layer 5j, an intermediate layer 6j, and a dense layer 7j, which are stacked in the axial direction, similarly to the plurality of embodiments.

The rough layer 5j is substantially in a column shape, and is provided on the side of an inflow passage 31j of the second plate 3j. The intermediate layer 6j substantially in a column shape is provided above the rough layer 5j. The dense layer 7j has a dense layer bottom portion 71j and a dense layer side wall portion 72j. The dense layer bottom portion 71j is substantially in the shape of a circular disk. The dense layer side wall portion 72j is substantially in the shape of a circular cylinder extending in the axial direction from the outer peripheral side of the dense layer bottom portion 71j. The dense layer bottom portion 71j is provided above the intermediate layer 6j. The dense layer side wail portion 72j is provided so as to cover the side wall of the intermediate layer 6j and part of the side wall of the rough layer 5j. The dense layer side wall portion 72j has a dense layer projecting portion 73j, which extends from the entire periphery of the dense layer side wail portion 72j toward the outer peripheral side.

The element 4j is supported by the element support plate 11j in a structure to be described below. The upper side of the dense layer projecting portion 73j is butted against the flange portion 24j of the first plate 2j, and the lower side of the dense layer projecting portion 73j is butted against the flange portion 34j of the second plate 3j. In this condition, the crimped portion 37 of the second plate 3j is bent, thereby fixing the first plate 2j to the second plate 3j.

Next, various fixing structures, in which the case is fixed to the cap so as to therebetween interpose the dense layer projecting portion, will be described with reference to FIGS. 14 to 18. The case and the cap to be described here may be made of resin or metal.

Ninth Embodiment

As shown in FIG. 14, a case 320 and a cap 330 are fixed to each other by bolts 380 passing though flange portions 324, 334 and nuts 381 screwed on the bolts 380. O-rings 77 may be provided respectively between the flange portion 324 and the dense layer projecting portion 73, and between the flange portion 334 and the dense layer projecting portion 73.

Tenth Embodiment

As shown in FIG. 15, a cap 430 has a claw portion 438 formed at a flange portion 434 of the cap 430. The claw portion 438 extends downward from the outer peripheral end of the flange portion 434 and engages with a flange portion 424 of a case 420. The case 420 is fixed to the cap 430 by engaging the claw portion 438 with the flange portion 424 of the case 420.

Eleventh Embodiment

As shown in FIG. 16, a cap 530 has an engaging hole 539 formed in a flange portion 534 thereof. The engaging hole 539 is formed in a portion extending downward from the outer peripheral side end portion of the flange portion 534. A flange portion 524 is engaged with a case 520 with the engaging hole 539. The case 520 is fixed to the cap 530 by engaging the flange portion 524 of the case 520 with the engaging hole 539.

Twelfth Embodiment

Figure 17:
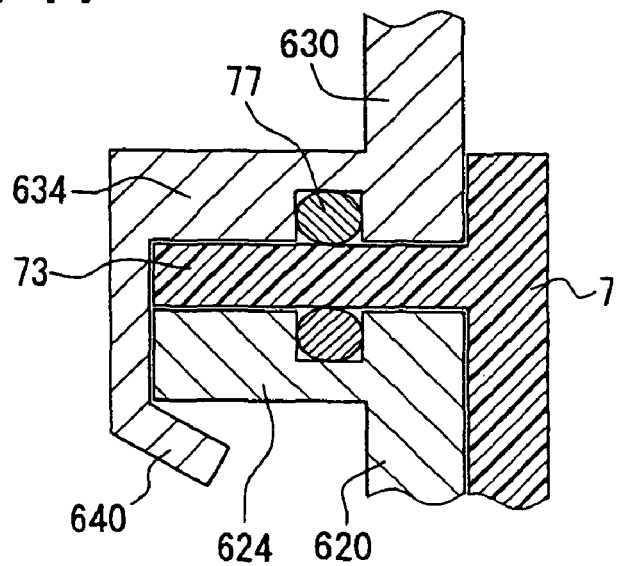
FIG. 17 is a cross-sectional view of a main portion of a fuel filter according to a twelfth embodiment of the present invention.

As shown in FIG. 17, a cap 630 has a crimped portion 640 formed at a flange portion 634 thereof. The crimped portion 640 extends downward from the outer peripheral end of the flange portion 634. A case 620 is fixed to the cap 630 by bending the crimped portion 640 to a flange portion 624 of the case 620 to latch the crimped portion 640 on the flange portion 624.

Thirteenth Embodiment

Figure 18:
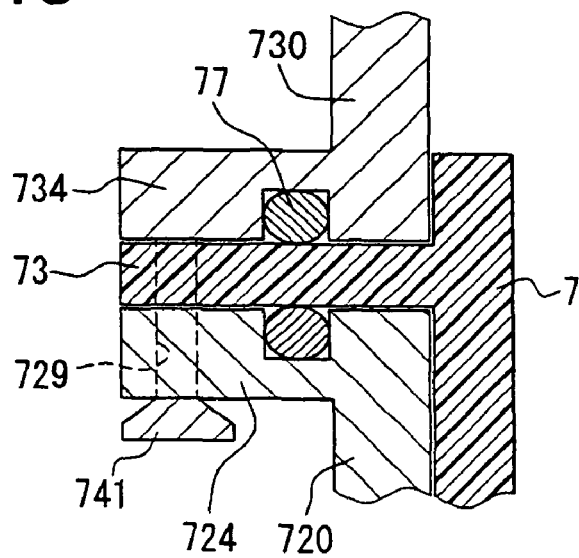
FIG. 18 is a cross-sectional view of a main portion of a fuel filter according to a thirteenth embodiment of the present invention.
Figure 19:
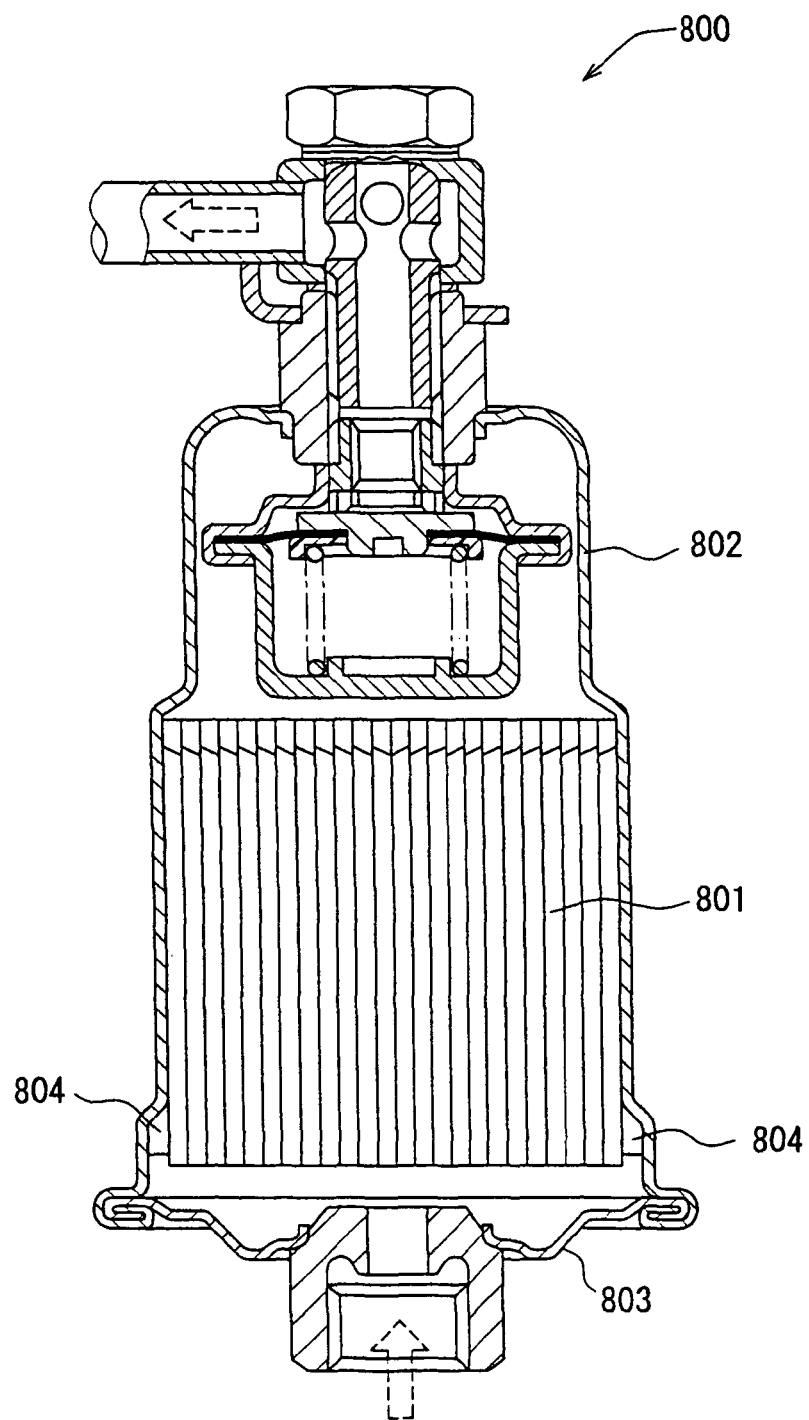
FIG. 19 is a cross-sectional view of a filter of a related art.

As shown in FIG. 18, a cap 730 has a connecting bar 741 formed at a flange portion 734 thereof. The connecting bar 741 extends downward from the lower end surface of the flange portion 734. A case 720 is fixed to the cap 730 by inserting the connecting bar 741 through a through hole 729 formed in a flange portion 724 of the case 720 and by crimping a portion of the connecting bar 741 projected out of the through hole 729 by heating the portion.

Automobiles are used throughout the world, and the quality of fuel (the amount and size of foreign matters contained in the fuel) is different among countries where the automobiles are used. Moreover, there are various kinds of internal combustion engines mounted in the automobiles (displacement, gasoline engine, diesel engine). For these reasons, there is a demand that the fuel filter 1 needs to be applicable to the qualities of various kinds of fuel and to various kinds of internal combustion engine. According to the fuel filters and filter elements described in the first to twelfth embodiments, it is possible to enhance the performance of removing foreign matters in fluid so that to satisfy the demand.

In the above embodiments, the filter device includes the filtering member having the rough part, which is comparatively low in the density of flow pores for flowing fluid, and the dense part, which is comparatively high in the density of the flow pores. The filter device further includes support member that supports the filtering member and have the inflow passage and the discharge passage. The dense part supports the rough part, and is located between the rough part and the discharge passage, and is supported by the mechanical pressure applied by the support member.

In this structure, the dense part is comparably higher than the rough part in the mechanical strength. Therefore, the filtering member is further tightly in contact with the support member without impairing the filtering property, even being applied with the mechanical pressure. Thus, the filtering member can be supported using the support member, even not being applied with glue. Further, the sealing property between the filtering member and the support member can be secured. Consequently, a filtering area of the filtering member can be possibly secured, and a removing function of foreign matters of the filter device can be enhanced.

The dense part may be located between the rough part and the inlet portion of the discharge passage. In this structure, the dense part is located between the rough part and the inlet portion of the discharge passage, and most of fluid flowing from the inflow passage is discharged through the discharge passage steadily after passing through the rough part and the dense part. Thus, the filtering member can be enhanced in both the removing property of foreign matters and the lifetime.

The filtering member may have the density of the flow pores changed stepwise from the rough part to the dense part. In this structure, the filtering member has the density of the flow pores changed stepwise from the rough part to the dense part, and the filtering member having the rough part and the dense part can be readily manufactured by combining filtering members each having the density of the flow pores with each other.

Alternatively, the filtering member may have the density of the flow pores changed continuously from the rough part to the dense part. The filtering member has the density of the flow pores changed continuously from the rough part to the dense part, and the filtering member can be highly enhanced in both the removing property of foreign matters and the lifetime.

The dense part is applied with the mechanical pressure from the support member at a portion highest in the density of the flow pores. In this structure, the dense part is applied with the mechanical pressure from the support member at the portion highest in the density of the flow pores. The portion highest in the density of the flow pores is high in the mechanical strength, thereby being capable of rigidly supporting the filtering member and the support member.

The support member may include the first support member and the second support member that are divided from each other in the axial direction. The dense part may be supported by being applied with the mechanical pressure in the axial direction when the first support member is combined with the second support member. In this structure, the support member includes the first support member and the second support member that are divided from each other in the axial direction, and the dense part is supported by being applied with the mechanical pressure in the axial direction when the first support member is combined with the second support member. Therefore, the filtering member can be rigidly supported using the support member, and in addition, the sealing property between the filtering member and the support member can be enhanced.

The dense part may have the dense part side projecting portion projecting from the rough part to the outer peripheral side. The dense part side projecting portion may be supported by the first support member and the second support member by being pinched between the first support member and the second support member. In this structure, the dense part of the filtering member has the dense part side projecting portion projecting to the outer peripheral side, and is pinched between the first support member and the second support member. Therefore, the filtering member can be easily positioned with respect to the axial direction in the support member.

The dense part may have the dense part side projecting portion projecting to the outer peripheral side. The rough part may have the rough part side projecting portion projecting to the outer peripheral side. Both the dense part side projecting portion and the rough part side projecting portion may be pinched and supported by the first support member and the second support member. In this structure, the rough part also has the rough part side projecting portion projecting to the outer peripheral side, similarly to the dense part, and both the dense part side projecting portion and the rough part side projecting portion are pinched and supported by the first support member and the second support member. Therefore, the dense part and the rough part can be rigidly supported, in addition to rigidly supporting of the dense part using the support member and securing of the sealing property.

One of the first support member and the second support member may pinch the dense part, and may have the axial end from which the protrusion extends in the axial direction. In this structure, one of the first support member and the second support member pinches the dense part, and has the axial end from which the protrusion extends in the axial direction, and the dense part can be applied with comparably high mechanical pressure, so that the sealing property between the filtering member and the support member can be enhanced.

The first support member, the second support member, and the filtering member may be made of resin. The first support member may be butted against the second support member to pinch at least the dense part side projecting portion. The first support member and the second support member may have outer walls defining the groove, in which melted resin is flowed for melting and bonding the first support member, the second support member, and the dense part side protrusion.

In this structure, the first support member is butted against the second support member to pinch at least the dense part side projecting portion. Thereafter, melted resin can be flowed in the groove, which is defined in the outer walls of the first support member and the second support member, for melting and bonding the first support member, the second support member, and the dense part side protrusion. The first support member, the second support member, and the dense part side protrusion can be welded to and rigidly fixed to each other by flowing the melted resin.

The first support member, the second support member, and the filtering member may be made of resin. The filter device may further include the resin cover for covering the dense part side projecting portion. The resin cover may cover both the dense part side projecting portion and the rough part side projecting portion. The cover may be welded and bonded to the first support member and the second support member therebetween. In this structure, the resin cover covers the dense part side projecting portion or both the dense part side projecting portion and the rough part side projecting portion, and the cover is welded and bonded to the first support member and the second support member therebetween. Therefore, the fluid can be restricted from leaking from the radial end surface of the dense part side projecting portion or the rough part side projecting portion.

The dense part may be supported by being applied with the mechanical pressure in the radial direction from the inner wall of the support member toward the central axis of the support member. In this structure, the dense part is comparably higher than the rough part in the mechanical strength. Therefore, the filtering member can be supported using the support member without impairing the filtering property, even when the rough part is press-inserted into the support member.

The dense part may include: the plate-shaped bottom portion for supporting the rough part; and the side wail portion extending in the axial direction from the bottom portion and covering the side surface in the radial direction of the rough part. In this structure, fluid flowing into the rough portion is discharged from the discharge passage after passing through the dense part. Fluid flowing around the outer periphery of the rough portion is discharged from the discharge passage after passing through the dense part. Fluid flowing into the support member is discharged from the discharge passage steadily after passing through the dense part, even when the fluid passes through any paths. Thus, small foreign matters contained in fluid can be captured.

The support member is formed of the resin material same as the material of the filtering member. In this structure, all the support member and the filtering member are formed or the same resin material, and can be easily recycled.

The filtering member is formed of a polyacetal resin. The polyacetal resin is excellent in the thermal resistive property. The filtering member can elongate the life thereof for filtering fuel, by being formed of the polyacetal resin.

The filter may filter fuel for the automobile. Automobiles are used throughout the world, and the quality of fuel (the amount and size of foreign matters contained in the fuel) is different among countries where the automobiles are used. Moreover, there are various kinds of internal combustion engines mounted in the automobiles. Accordingly, an amount of fuel passing through the fuel filter differs in dependence upon the kind of the internal combustion engines. The filter device is enhanced in the removing property of foreign matters, so that excellent in filtering fuel for automobiles.

The above filter device can be used for filtering fluid other than fuel.

The above structures of the embodiments can be combined as appropriate.

Various modifications and alternations may be diversely made to the above embodiments without departing from the spirit of the present invention.

What is claimed is:

1. A filter device comprising:
a filtering member having a rough part, which is low in a density of flow pores for flowing fluid, and a dense part, which is high in the density of the flow pores; and
a first support member being in a cylindrical shape that supports the filtering member, and has a discharge passage,
a second support member being in a cylindrical shape that supports the filtering member, and has an inflow passage,
wherein the dense part supports the rough part,
the dense part includes:
a bottom portion being in a plate-shape, the bottom portion being located between the rough part and the discharge passage and supporting the rough part; and
a side wall portion extending in an axial direction of the first support member from the bottom portion and covering at least a portion of a side surface of the rough part in a radial direction,
the dense part is supported by being applied with a mechanical pressure from at least one of the first support member and the second support member,
the rough part is in contact with the dense part such that fluid is able to flow through the rough part and the dense part in this order,
the bottom portion of the dense part entirely covers a bottom surface of the rough part, and
the filtering member further includes an intermediate layer disposed between the rough part and the bottom portion of the dense part.

2. The filter device as claimed in claim 1, wherein the dense part is located between the rough part and an inlet portion of the discharge passage.

3. The filter device as claimed in claim 1, wherein the filtering member has the density of the flow pores changed stepwise from upstream to downstream in a fuel flow direction.

4. The filter device as claimed in claim 1, wherein the filtering member has the density of the flow pores changed gradually from upstream to downstream in a fuel flow direction.

5. The filter device as claimed in claim 1, wherein the dense part is applied with the mechanical pressure from at least one of the first support member and the second support member at a portion highest in the density of the flow pores.

6. The filter device as claimed in claim 1,
wherein the first support member and the second support member are arranged in the axial direction, and
the dense part is supported by being applied with a mechanical pressure in the axial direction when the first support member is combined with the second support member.

7. The filter device as claimed in claim 6,
wherein the dense part has a dense part projecting portion projecting to an outer peripheral side with respect to the rough part, and
the dense part projecting portion is pinched and supported between the first support member and the second support member.

8. The filter device as claimed in claim 6,
the dense part has a dense part projecting portion projecting to an outer peripheral side,
the rough part has a rough part projecting portion projecting to the outer peripheral side, and
both the dense part projecting portion and the rough part projecting portion are pinched and supported between the first support member and the second support member.

9. The filter device as claimed in claim 6,
wherein the first support member and the second support member therebetween pinch the dense part, and
at least one of the first support member and the second support member has an axial end from which a protrusion extends in an axial direction.

10. The filter device as claimed in claim 7,
wherein the first support member, the second support member, and the filtering member are made of resin,
the first support member is butted against the second support member to pinch at least the dense part projecting portion, and
the first support member and the second support member have outer walls defining a groove, in which melted resin is flowed for melting and bonding the first support member, the second support member, and the dense part projecting portion.

11. The filter device as claimed in claim 7,
wherein the first support member, the second support member, and the filtering member are made of resin,
the filter device further comprising:
a cover formed of resin and covering the dense part projecting portion or covering both the dense part projecting portion and the rough part projecting portion,
wherein the cover is welded and bonded to the first support member and the second support member therebetween.

12. The filter device as claimed in claim 1,
wherein the dense part is supported by being applied with the mechanical pressure in a radial direction from an inner wall of the support member toward a central axis of the support member.

13. The filter device as claimed in claim 1, wherein the support member is formed of a resin material same as a material of the filtering member.

14. The filter device as claimed in claim 1, wherein the filtering member is formed of a polyacetal resin.

15. The filter device as claimed in claim 1, wherein the filtering member filters fuel for an automobile.

16. A filter device comprising:
a filtering member; and
a support member that supports the filtering member, and has an inflow passage and a discharge passage,
wherein the filtering member has a rough part, which is low in a density of flow pores for flowing fluid, and a dense part, which is high in the density of the flow pores,
the dense part has a plurality of flow pores, which are smaller in size than a plurality of flow pores of the rough part in diameter,
the dense part is located between the rough part and the discharge passage, and supported by being applied with a mechanical pressure from the support member,
the dense part includes:
a bottom portion being in a plate-shape and supporting the rough part; and
a side wall portion extending in the axial direction from the bottom portion and covering at least a portion of a side surface of the rough part in a radial direction, the dense part supports the rough part such that, in use, liquid flowing between the rough part and the support member flows into the side wall portion of the dense part, the rough part is in contact with the dense part such that fluid is able to flow through the rough part and the dense part in this order, the bottom portion of the dense part entirely covers a bottom surface of the rough part, and the filtering member further includes an intermediate layer disposed between the rough part and the bottom portion of the dense part.

* * * * *